United States Patent [19]
Eichenberger

[11] 3,892,492
[45] July 1, 1975

[54] OPTOELECTRICAL APPARATUS WITH DIRECTIONAL LIGHT SOURCES FOR DETECTING REFLECTION BEHAVIOUR OF AN OBJECT

[75] Inventor: Werner Eichenberger, Zurich, Switzerland

[73] Assignee: Aktiengesellschaft Gebruder Loepfe, Wetzikon, Switzerland

[22] Filed: July 9, 1973

[21] Appl. No.: 377,824

[30] Foreign Application Priority Data
Oct. 16, 1972 Switzerland.................... 15184/72
Dec. 21, 1972 Switzerland.................... 18649/72

[52] U.S. Cl. ............ 356/199; 139/273 A; 250/571; 356/205; 356/210; 356/211
[51] Int. Cl....................... G01n 21/18; G01n 21/30
[58] Field of Search ....... 356/93, 95, 159, 160, 199, 356/200, 205, 210, 211, 212, 238; 139/273 A; 250/562, 563, 571, 572

[56] References Cited
UNITED STATES PATENTS

| | | |
|---|---|---|
| 2,510,347 | 6/1950 | Perkins .............................. 356/159 |
| 3,053,986 | 9/1962 | Loepfe et al...................... 356/159 |
| 3,069,964 | 12/1962 | Simon................................ 356/159 |
| 3,631,901 | 1/1972 | Langenbach et al. .............. 250/563 |
| 3,653,772 | 4/1972 | Berge................................. 356/205 |
| 3,666,362 | 5/1972 | Chance ............................... 356/93 |
| 3,693,671 | 9/1972 | Dasai.............................. 139/273 A |
| 3,734,631 | 5/1973 | Justice et al....................... 356/95 |

Primary Examiner—Vincent P. McGraw
Attorney, Agent, or Firm—Werner W. Kleeman

[57] ABSTRACT

An optoelectrical apparatus comprising light transmitting means for generating two pulsed light beams in such a manner that the light pulses of each beam follow the light pulses of the other beam in alternate sequence, light receiving means including light sensing means responsive to light generated by the transmitting means and producing an electric output signal representative of the waveform of the received light, and electronic means operatively connected to the output of the light sensing means for discriminating output signals of different waveform. The apparatus may be designed for light reflection or light absorption measurements and monitoring purposes.

3 Claims, 11 Drawing Figures

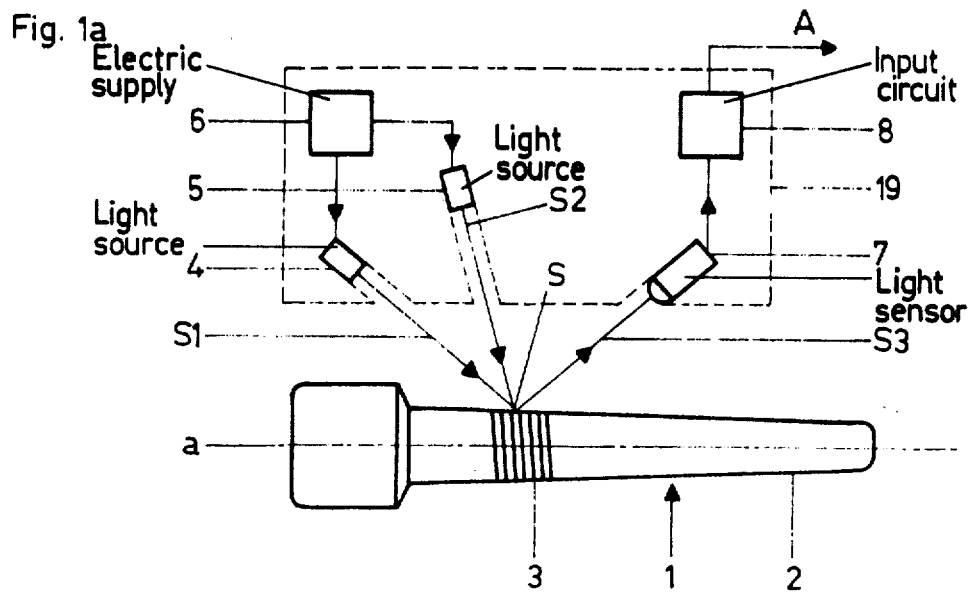
Fig. 1a
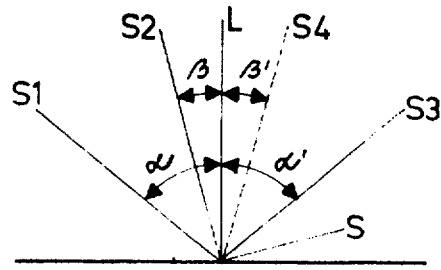
Fig. 1b
Fig. 3
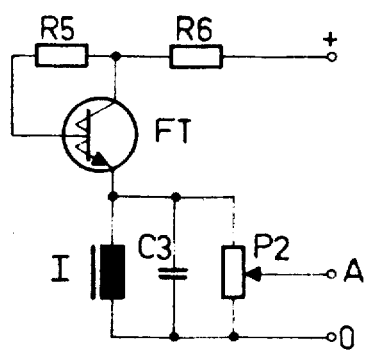
Fig 2
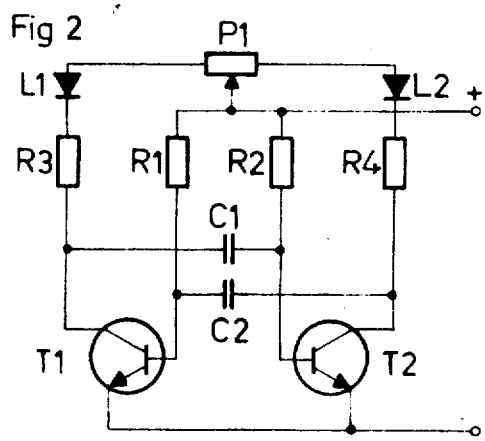

3,892,492

3,892,492

OPTOELECTRICAL APPARATUS WITH DIRECTIONAL LIGHT SOURCES FOR DETECTING REFLECTION BEHAVIOUR OF AN OBJECT

BACKGROUND OF THE INVENTION

The present invention relates to a new and improved optoelectrical apparatus comprising light transmitting means and light receiving means.

A first group of optoelectrical devices of this kind serve for detecting the presence or passage of an object at a monitoring position. This may be done by utilizing light reflected from the object or from a surface arranged behind the object, or light transmitted through and/or passing by the object on its way from the transmitter to the receiver. Examples of such known devices are optoelectrical filling yarn or weft monitors on weaving machines and the so-called light barriers of the reflective and transmissive type.

A second group of such optoelectrical devices comprises apparatuses for measuring the reflectivity of a surface, the absorption or transmission power of translucent objects, or the light absorption of opaque objects.

Such devices, among others, are used for measuring a transverse dimension of a running yarn in a so-called yarn clearer on winding machines.

The inventive apparatus may serve for all those applications and others. In particular, the novel apparatus may be used for monitoring fast moving objects or measuring optical parameters which undergo fast changes and which are to be continuously surveyed and call for continuous and inertialess detection and/or measurement.

In the field of monitoring light reflected from a surface of an object, devices for surveying the full and empty conditions of coils and bobbins, in particular filling yarn or weft bobbins on shuttle looms, are known, e.g. from British Pat. No. 651,348, U.S. Pat. No. 2,522,101 and Swiss Pat. No. 393,218. Those prior art bobbin feelers comprise a single light source which generates a continuous light stream and two photocells as light sensors. Light beams from the source impinge upon the surface of the bobbin when the latter is in a predetermined monitoring position with respect to the bobbin feeler. In the full condition of the bobbin, the impinging light is reflected diffusely from the surface of the yarn winding, and the light receiving means does not respond to the relatively weak diffuse light. However, when the bobbin is depleted or empty, said light beams strike two separate longitudinal sections of the bobbin core having different light absorbing or reflecting properties, so that the beams which are reflected and impinge upon the photocells have different intensity. In this case, the light receiving means produces a signal which is used to operate the stopping mechanism of the loom. It is evident that the proper operation of those prior art bobbin feelers depends on the use of weft bobbins prepared to provide zones of different light reflecting or light absorbing properties on the surface of the bobbin, in order to discriminate between the empty and full conditions of the bobbin. This fact not only impedes, but also precludes in many cases, the employment of bobbin feelers of this type. Other known bobbin feelers suffer from similar or other drawbacks.

In the field of measuring light absorbed by an opaque object, optoelectronic yarn clearing equipment is known from U.S. Pat. No. 2,565,500. This known apparatus comprises a single light source and two photocells illuminated by the light source. A running yarn absorbs light coming from the source and received by one of the photocells. The second photocell serves to compensate for the long-time or slow changes of the light produced by the light source, however, it is unable to compensate for ambient light, e.g. sunlight, acting with different and variable intensity on the two photocells.

SUMMARY OF THE INVENTION

It is a primary object of the invention to provide a novel optoelectrical principle and apparatus which avoid the aforementioned drawbacks of the known optoelectrical devices serving for monitoring and measuring purposes.

A further object of the invention is the provision of an optoelectrical monitoring apparatus which is able to distinguish a surface condition of predominantly diffuse light reflection from a surface condition of predominantly regular light reflection.

Another more specific objective of the invention is the construction of a weft bobbin feeler which can be used with conventional weft bobbins without requiring any preparation of the bobbin core and which nevertheless works safely.

With such bobbins or bobbin cores the bobbin bearing a yarn winding exhibits a predominantly diffuse light reflection, whereas the empty bobbin core presents a predominantly regular light reflection.

It is to be understood that generally neither a purely diffuse reflection nor a purely regular reflection exists, and thus the difficulty resides in rendering the relation between the signal due to the predominantly regular reflection and the base signal due to the predominantly diffuse reflection as large as possible.

In order to attain this objective, the invention aims at suppressing the base signal as much as possible without essentially decreasing the first mentioned signal.

Now in order to implement the aforementioned objectives and others which will become more readily apparent as the description proceeds, the optoelectrical apparatus of the invention is generally characterized by light transmitting means for generating two pulsed light beams in such a manner that the light pulses of each beam follow the light pulses of the other beam in alternate sequence, and further by light receiving means including light sensing means responsive to light generated by the transmitting means.

In the event that the inventive optoelectrical apparatus is positioned relative to a surface having predominantly regular reflecting properties in such a manner that one of said pulsed light beams and the optical axis of said light sensor are at equal angles to the normal of said surface, a strong signal will arise due to said pulsed light beam being regularly reflected. However, when a diffusely reflecting covering is applied to the regularly reflecting surface, or a diffusely reflecting object is positioned in place of the regularly reflecting surface, both said light beams will be reflected diffusely, and it is feasible to adjust the portions of said beams impinging on the light sensor such that their intensities will become essentially equal.

In accordance with a preferred embodiment of the inventive optoelectrical apparatus there are provided a light transmitter having two inertialess sources of unidirectional light beams, a pulse generator for activating the light sources in alternatively successive time intervals, and setting means for adjusting the relation of the intensities of the light beams emanating from the two light sources.

Particularly, the pulse generator may be a multivibrator comprising a potentiometer as a means for adjusting the relation of the intensities of the two light beams. The light receiver may comprise an inertialess light sensor and a thereto connected amplifier tuned to the frequency of the pulse generator. The light sources and the light sensor may be semiconductor components, such as luminescent diodes, and a photodiode or phototransistor, respectively.

The optoelectrical devices of the invention may be further used for a great variety of technical purposes, e.g. as cop monitors on yarn winding machines, for counting articles or objects in manufacturing plants, as revolution counters on machines, as controls for package sorting equipment, for controlling the position and guiding the edges of running webs in textile plants and others, as reflection light barriers and other applications.

It is to be noted that terms such as monitoring, monitor, monitoring device etc. are used in this patent with respect to processes and means for discriminating between two conditions of reflectivity, transmissivity or absorption of light, whereas terms such as measuring, measuring device etc. refer to methods and means for processing an input signal in an analogous way for producing an output signal indicative of the amount of the input signal, or variation of the amount of the input signal. The term waveform as used in the claims refers to the magnitude as well as the shape of the relevant signals.

BRIEF DESCRIPTION OF THE DRAWINGS

The invention will be better understood and objects other than those set forth above will be apparent upon consideration of the following detailed description thereof which makes reference to the annexed drawings wherein:

FIG. 1a is a schematic representation of a weft bobbin feeler used on a shuttle loom;

FIG. 1b illustrates the angles which the various rays form with the normal of incidence with respect to the surface of the bobbin shown in FIG. 1a in the monitoring position;

FIGS. 2 and 3 are diagrams of the electronic circuits of the weft bobbin feeler represented by FIG. 1a;

DETAILED DESCRIPTION OF THE PREFERRED EMBODIMENTS

Figure 4:
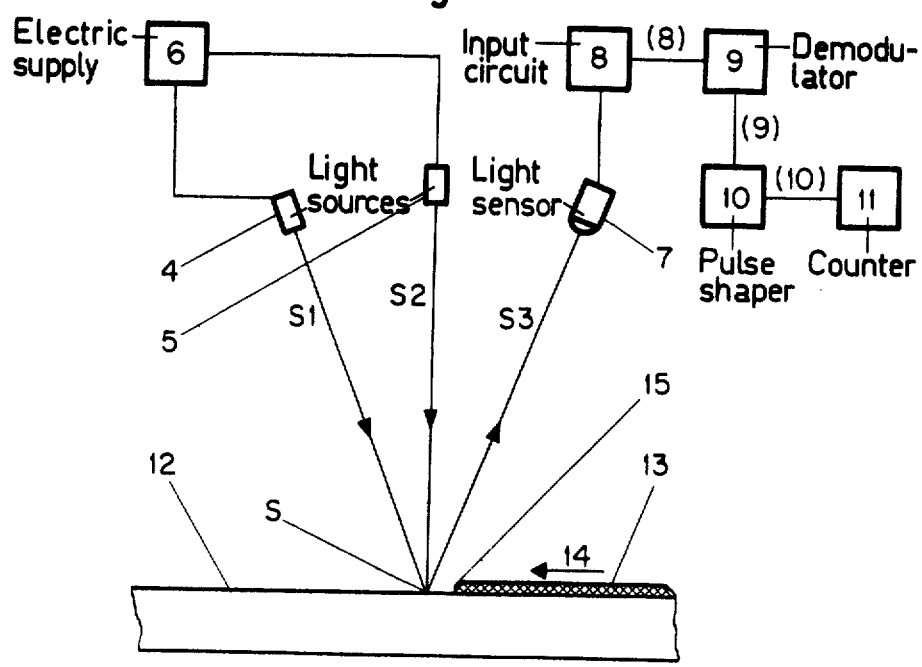
FIG. 4 illustrates in similar representation as FIG. 1a a monitoring device for detecting the passage of an edge of a diffusely reflecting object by a monitoring position.

Describing now the drawings, in FIG. 1a a weft bobbin 1 having a bobbin core 2 bears a residual winding 3 of yarn. The shuttle which carries the weft bobbin when the loom is working has not been shown for the sake of clarity in illustration and the same is true for other parts of the loom.

The inventive weft bobbin feeler comprises a light transmitter having two directional light sources 4 and 5 and an electric supply unit 6, and a light receiver comprising a light sensor 7 and an input circuit 8. Preferably the parts of the light transmitter and receiver are housed in a common casing which is fixedly mounted on the loom. The casing has been schematically shown by the broken lines 19. Either light source 4, 5 generates a light beam, the center of middle line of which forms the optical axis S1 or S2 of the associated light source. These optical axes have an intersecting point S coinciding with the surface of the bobbin core 2 when in its monitoring position. The light sources may be complemented by luminescent diodes L1, L2 as shown in FIG. 2 for generating light in the visible or invisible portion of the spectrum. Many such types of luminescent diodes are known to the art e.g. gallium arsenide, gallium phosphide or gallium-arsenide-phosphide diodes.

The light sensor 7 may be constituted by a phototransistor FT, FIG. 3, as an optoelectrical transducer. Of course, the spectral range covered by the light from the luminescent diodes should be accommodated to the range of spectral sensibility of the light sensor.

The arrangement and operation of the electrical supply unit 6 and input circuit 8 will be described later in connection with FIGS. 2 and 3.

The weft bobbin 1 is monitored in a predetermined or approximately defined position in the path of the shuttle. This refers to the cases of monitoring during the shuttle flight as well as monitoring in a location close to or in one of the end positions of the shuttle, i.e. a shuttle box. The monitoring position and the movement of the shuttle do not affect the principle underlying the invention in a substantial way, i.e., the monitoring operation may be performed when the shuttle is flying as well as after the shuttle has entered the shuttle box. In some cases, and in particular with multi-shuttle looms, monitoring during the shuttle flight embodying a triggering procedure is advisable. Thereby, the monitoring apparatus is activated only when the shuttle occupies a definite location or range along the shuttle path which is defined by the position of the bobbin feeler on the loom. Such a known triggering procedure is not an object of the invention and thus need not be described at this point.

Now the geometric arrangement of the light sources 4, 5 and the light sensor 7 relative to the weft bobbin 1 when in its monitoring position will be explained with reference to FIGS. 1a and 1b.

As shown in FIG. 1a, a residual winding 3 is positioned on the bobbin core 2 at either side of point S at the moment of sensing. In FIG. 1b, the normal of incidence L at point S with respect to the side line or extension of bobbin core 2 is drawn as a reference line. The first light source 4 and light sensor 7 are located with their optical axis S1 and S3 intersecting at point S, forming equal angles $\alpha$, $\alpha'$ with the normal L and being situated in a plane which comprises the longitudinal axis of a of the bobbin 1.

The second light source 5 is preferably situated in or close to this plane and between the first light source 4 and the normal L. However, the monitoring apparatus also works with the second light source 5 arranged at the normal L or on the other side of the normal L and between the same and the light sensor 7.

By virtue of the above-described arrangement there is provided a predominantly regular reflection when the bobbin is empty and the smooth surface of the bobbin core 2 is exposed. In this case, light from the first light source 4 reflected in the direction of the optical axis S3, rather than light from the second light source 5 regularly reflected in the direction of ray S4, arrives at the light sensor 7. The beams S2 and S4 form equal angles $\beta$ and $\beta'$ with the normal L.

On the other hand, with a winding 3 located on the bobbin core 2 light from the light sources 4, 5 is diffusely reflected at the surface of the winding, so that light from both of said light sources is reflected in the direction of the optical axis S3 and reaches the light sensor 7.

The difference in the light reflecting properties of the empty and full or winding-bearing bobbin cores is employed for indicating the winding condition of the bobbin with the help of supply unit 6 and the electronic circuits of the light receiver.

According to FIG. 2, the supply unit 6 is designed as a free running multivibrator comprising two transistors T1, T2, base resistors R1, R2 and coupling capacitors C1, C2. The collector of each transistor T1 and T2 is connected in series with a resistor R3 and R4, respectively, and a luminescent diode L1 and L2, respectively. The anodes of the luminescent diodes L1 and L2 are connected via a potentiometer P1 with a positive voltage source. Because of this arrangement, the luminescent diodes are periodically activated in alternate time intervals with a frequency controlled by the multivibrator, e.g. 10 kilocycles per second, to produce rectangular light pulses such that each light pulse from one luminescent diode follows the light pulse from the other luminescent diode without interruption. The currents supplied to the luminescent diodes are defined by the setting of the potentiometer P1. Thus, the relation of the light fluxes transmitted by the luminescent diodes may be changed arbitrarily within certain limits.

FIG. 3 is a circuit diagram of the input circuit 8 which is operatively connected to the phototransistor FT comprised by light sensor 7, FIG. 1, which phototransistor is arranged in gounded emitter connection. The base of phototransistor FT is connected to a positive voltage source through base resistor R5 and protection resistor R6, and the collector of phototransistor is connected to a point between resistor R5 and R6. In parallel connection to the emitter circuit there are an inductance I, a capacitor C3 and a potentiometer P2, at whose tap the AC-output signal A of the input circuit appears. By appropriate dimensioning of the tank circuit comprising inductance I and capacitor C3 the amplifier is tuned to the frequency of multivibrator 6.

Provided that bobbin 1 bears a winding or residual winding 3, light produced by the first and second light sources 4, 5 and reflected diffusely at the winding 3 reaches light sensor 7. The light transmitter is adjusted with fixedly arranged bobbin 1, by means of potentiometer P1, FIG. 2, in such a manner that the light beams coming from light sources 4, 5 and reflected diffusely at winding 3 are equal as received by light sensor 7. Thus, in the collector circuit of phototransistor FT a DC-signal appears which is short-circuited through inductance I and thus produces no or only a very small DC-output signal A. The same refers to the case where the loom is operating.

After bobbin 1 has run empty, phototransistor FT is activated only by light emanating from the first light source 4 and reflected in a predominantly regular way at bobbin core 2. Since this light is pulsed with a frequency of e.g. 10 kilocycles per second, a similar AC-signal A appears at the output of circuit 8. This output signal A may be processed in known manner and then passed to a switching device causing the empty bobbin to be replaced by a full one. Further circuits (not shown) for processing the signal A may for this purpose be operatively connected to the output of circuit 8, as will be shown later on, by way of example, with reference to FIG. 4.

The values of angles $\alpha$, $\beta$ may be, by way of example, 60° and 20°, respectively. However, these values are in no way critical, and thus the value of $\alpha$ may be increased as much as the geometrical relations allow for. Since with a shuttle loom the photoelectrical apparatus cannot be mounted indefinitely close to the bobbin core to be monitored, an upper limit is set to the choice of the value of angle $\alpha$. Also the value of angle $\beta$ is not critical, however, this value should be distinctly different from $\alpha$ in order to avoid light from the second light source 5 and reflected in a predominantly regular way at bobbin core 2 from reaching the light sensor 7. Moreover, light source 5 need not be positioned in the plane defined by beams S1 and S3, since even with a position outside such plane light emanating from light source 5 is diffusely reflected to the light sensor 7. In this case, the condition should be considered that S2 intersects S1 and S3 in a common spot or point S, since otherwise beams S1, S2 do not strike the same spot on bobbin core 2.

The photoelectrical apparatus shown schematically in FIGS. 1 – 3 and described in the foregoing context may be modified in various respects.

Firstly, it is not necessary for the light sources 4, 5 to transmit light pulses in uninterrupted succession, i.e. without gaps between them. In other words, light pulses of a recurrent frequency $f$ produced by the one light source 5 may be interposed with gaps between light pulses of like frequency from the light source 4. In this case, the diffusely reflected light pulses coming from light source 4 give rise to a relatively high AC-out-put signal A of frequency $f$, whereas with adequately adjusted united light pulses from both light sources 4, 5 acting on light sensor 7 with the double frequency $2f$ the tuned tank circuit of amplifier 8 gives rise to a much lower AC-output signal A.

Secondly, it is not essential to use a resonant or tuned circuit 8 in the described optoelectrical apparatus. However, such a tuned circuit is advantageous since it renders easier an exact mutual equalization of the diffusely reflected light pulses emanating from the two light sources 4 and 5. It is moreover advantageous to provide for a sufficiently large inductance I together with a sufficiently small DC resistance, in order to shortcircuit any DC-signal generated by ambient constant light, e.g. daylight, or direct sunlight, through inductance I and to avoid over-excitation of circuit 8 by such ambient light.

The monitoring device shown in FIG. 4 may, for instance, serve for surveying the passage of the leading edge 15 of a diffusely reflecting object 13 moving on a support 12 in the direction of arrow 14 towards a monitoring location S, or towards a line through S perpendicular to the plane of the drawing. The output of this monitoring device may be connected for operating a counting-, indicating-, control-, working-, or similar device. This mode of optical sensing necessitates that the support 12 and the object 13 possess sufficiently different reflective properties. In the present case it is assumed that support 12, e.g. a conveyor belt, exhibits a predominantly regular reflection, whereas object 13, e.g. a textile article or web, has predominantly diffuse reflective properties.

The components or parts 4–8 of this monitoring device may be the same as the corresponding parts described with reference to FIG. 1a, however, the light sources 4, 5 and the light sensor 7 are positioned such that the optical axis S2 of the second light source 5 coincides with the normal of incidence at point S and the optical axes S1 and S3 are arranged symmetrically to and form a smaller angle with the axis S2.

It is here to be assumed for instance that the monitoring device shown in FIG. 4 operates for counting the number of objects 13 passing the monitoring location S in the direction of arrow 14. For this purpose and in addition to the device of FIG. 1a, in FIG. 4 there are connected in series to the output of input circuit 8 a demodulator 9, a pulse shaper 10, e.g. a univibrator or oneshot, and a counter 11.

The monitoring device is adjusted with no object 13 being present in such a manner that as large as possible portion of the light of beam S1 will be reflected to light sensor 7, so that as high as possible AC-signal (8) appears at the output of input stage 8. Thereafter, a diffusely reflecting object 13 is placed at the monitoring location S, and the supply unit 6 is not adjusted in the manner described with reference to FIGS. 1 – 3, so as to make AC-signal (8) as low as possible. Thereby, the adjustment is accomplished.

Figure 5:
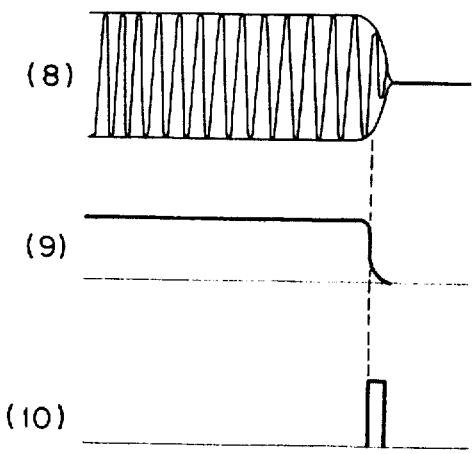
FIG. 5 illustrates some waveforms appearing in the light receiver shown in FIG. 4 during operation.

Now counting of objects 13 with support 12 moving in the direction of arrow 14 may begin. So long as the free surface of support 12 appears at point S, there is generated an AC-signal (8), FIG. 5, having the frequency produced by supply unit 6. The AC-signal is interrupted as the edge 15 of object 13 passes the monitoring location at S. The AC-signal is demodulated in demodulator 9 producing a DC-signal (9) having a sloping edge. In pulse shaper 10, the sloping DC-signal (9) is transformed into a rectangular counting pulse (10) which is supplied to a counter 11.

According to a modification of the invention, the device shown in FIG. 4 may serve for monitoring and controlling the lateral position of the edge 15 of a textile web carried by a support 12 as shown in FIG. 4, however, moving in a direction perpendicular to the drawing plane. In this case, the pulse shaper 10 may be a Schmitt-trigger, whereas counter 11 is replaced by a control device operating a reversible motor (not shown) for adjusting the transverse position of support 12 or web 13 relative to the monitoring location S. Every time the edge 15 passes the monitoring position S in one or the other direction, Schmitt-trigger 10 produces a step signal having an ascending or descending edge. The step signal causes control device 11 to execute movement of web 13 relative to position S in the direction of arrow 14 or the opposite direction.

Figure 6:
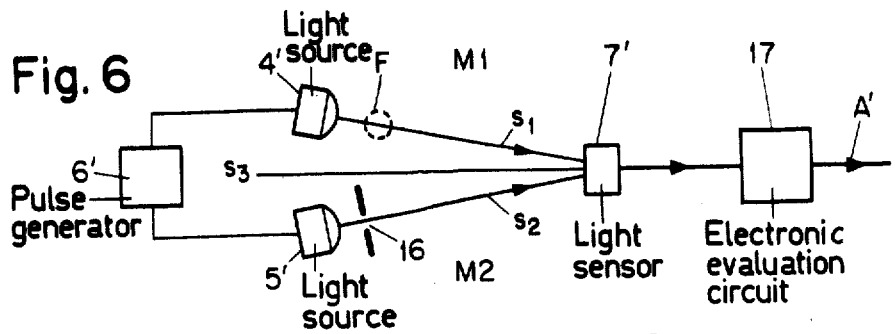
FIG. 6 is a schematic representation of an optoelectronic apparatus designed for measuring light absorption, e.g. the amount of light absorbed by a textile yarn.

The optoelectrical apparatus depicted in FIG. 6 is designed for measurements of transmitted rather than reflected light. Its light transmitter comprises two directional light sources 4', 5' provided with luminescent diodes, and a pulse generator 6', and its light receiver comprises a light sensor 7' provided with a phototransistor and an electronic evaluation circuit 17 operatively connected to light sensor 7'. Light sources 4' and 5' have their optical axes $s_1$ and $s_2$, respectively, which are defined by the maxima of their radiation pattern, directed towards light sensor 7'. A measuring area M1 and a compensation area M2 are provided between first light source 4' and sensor 7', and second light source and sensor 7', respectively. The measuring area M1 serves for accommodating an object, e.g. a textile yarn F, in order to measure its diameter or other transverse dimension. The compensation area M2 comprises an optical screen 16 having an aperture and may serve, by way of example, for adjusting or compensating the output signal A' of evaluation circuit 17 to zero when there is not object F present, or when an object having a predetermined transverse dimension is present in the measuring area. Thus, one may perform the compensation such that the output signal A' disappears when there is present a yarn or wire gauge of a definite diameter in the measuring area. The method of compensation depends on whether, in the case of yarn measurement, the diameter or the deviation from an average diameter or predetermined nominal value of a yarn are to be measured on a running yarn, by way of example.

The principle of the compensation will now be explained with reference to FIG. 7. It is to be assumed that light sources 4' and 5' are alternately activated by pulse generator 6' to produce rectangular light pulses $1_1$, $1_2$ which succeed with gaps, so that the pulses from one source appear exactly in the gaps between the pulses from the other source. For compensation, e.g. with void measuring area M1, the light pulses $1_1$, $1_2$ are adjusted to have the same amplitudes as shown by the solid lines in FIG. 7, at the upper and middle diagrams. In this case, the sum of the light pulses $1_1 + 1_2$ is a light stream of constant amplitude as shown by the horizontal line in the lower diagram of FIG. 7. Evaluation circuit 17 is designed such as to produce not output signal A' when the input signal is constant, which is the case with complete compensation.

Now when an object F, such as a yarn, has entered the measuring area M1, the light stream $1_1$ is reduced, as indicated by the dashed lines in the upper diagram. In this case, the sum of the light streams $1_1 + 1_2$ is no longer constant and may be represented by the toothed line in the lower diagram.

The evaluation circuit 17 may comprise, as an input stage, a phototransistor circuit similar to the one shown in FIG. 3, and further circuits for amplifying and processing the output signal of the phototransistor circuit.

The embodiment of the invention described with reference to FIGS. 6 and 7 may be modified in various respects. Thus, the optical axes $s_1$, $s_2$ of light sources 4, 5 may be directed parallel to each other, provided that light sensor 7', e.g. a photoelement or a solar cell, comprises a light-sensitive area large enough for receiving both light streams $1_1$, $1_2$. In this case the light streams $l_1$, $l_2$ may impinge on different parts of the light-sensitive area.

Figure 7:
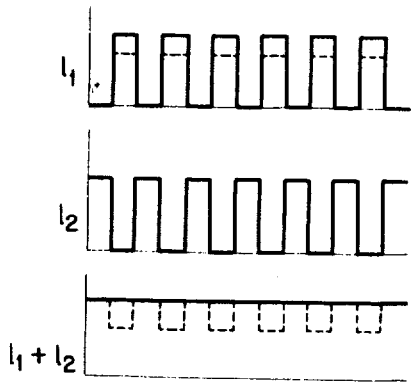
FIG. 7 is a pulse diagram illustrating the mode of operation of the apparatus represented in FIG. 6.

The relation of the duration of the light pulses $l_1$, $l_2$ transmitted from light sources 4', 5' is about 1:1 according to FIG. 7. Another relation may be chosen, or gaps may be provided between the pulses $l_1$ and $l_2$ if this is desirable. Furthermore, it is not essential to use a tuned evaluation circuit 17 or input circuit. It is feasible to perform the compensation by appropriate adjustment of the pulse generator 6' as described with reference to FIGS. 1a and 2, or to use optical means for this purpose, e.g. changing the distance of one of the light sources relative to light sensor 7', varying the direction of optical axis $s_1$ of light source 4' with respect to optical axis $s_3$ of light sensor 7', or by means of a screen having an adjustable aperture 16 positioned in the compensation area M2 between light source 5' and light sensor 7'.

It is an outstanding advantage of the aforementioned measuring device that it is possible to adjust the zero the output signal of the light sensor or of a thereto coupled input or further circuit, both with an object F present in the measuring area M1 as well as with a void measuring area, and thus to accommodate the compensation to any desired purpose. Moreover, the inventive arrangement and alternate operation of two light sources avoids undesired effects from ambient light, such as sunlight, from interfering with the operation of the optoelectrical apparatus.

Inventive measuring devices may be designed for surveying travelling threads on winding and weaving machines. Particularly, the electronic evaluation circuit may be arranged for distinguishing between yarn travel and standstill, or between yarn presence and yarn absence. That means such devices are able to indicate either of the conditions "travelling thread" or "resting thread," or conditions "present thread" or "absent (e.g. broken) thread." The output of such a yarn surveying device may be used operating an indication or control device. Preferred uses of such surveying devices are for weft stop motions on looms, in particular shuttleless looms, and yarn monitoring devices on automatic cross winding machines, for controlling the operation of the latter or its auxiliary devices.

Figure 8:
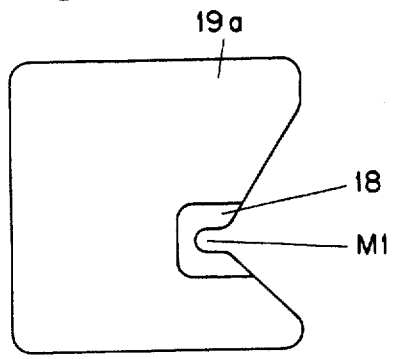
FIGS. 8 and 9 are schematic side views of an optoelectronic sensing and measuring unit incorporating the principles of the apparatus shown in FIG. 6.
Figure 9:
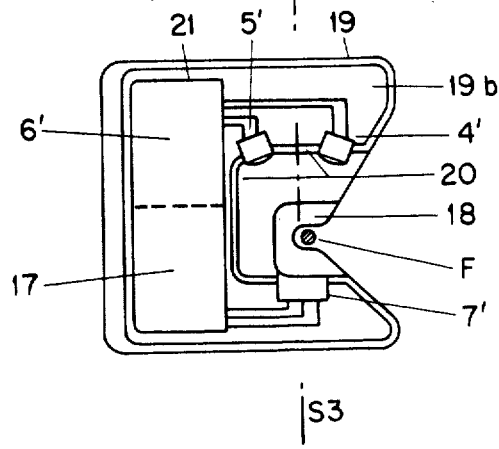

FIGS. 8 and 9 illustrate an embodiment of the inventive optoelectric measuring device as shown schematically in FIG. 6 and which is constructed as a compact and miniaturized yarn sensing unit for electronic yarn clearers on automatic cross-winding machines. Such a measuring device may be used for sensing a running yarn and producing an output signal indicative of the value of a transverse dimension of the yarn or thread, or of the deviation of said value from a nominal or average value. The sensing unit is formed as a flat box having substantially square cross-section, however, with a V-shaped cut-out on the right side in FIGS. 8 and 9 which is provided to facilitate entry of a yarn F into the measuring area M1. U-shaped yarn guides 18 are arranged in the sidewalls 19a, 19b of the casing 19 of the unit and limit transversal motion of yarn F, so that it is guided along a defined line when travelling.

As shown in FIG. 9 a substantially U-shaped transverse wall 20 is arranged in the interior of casing 19 for sealing the electronic components 4', 5', 7', 21 so as to be dustproof with respect to the exterior space. At the upper side of the measuring area there are two luminescent diodes 4', 5', and at the lower side of the measuring area the light sensor 7' is mounted tightly in apertures of transverse wall 20. The geometrical arrangement of the luminescent diodes and light sensor is similar to that shown and described with reference to FIG. 6.

Figure 10:
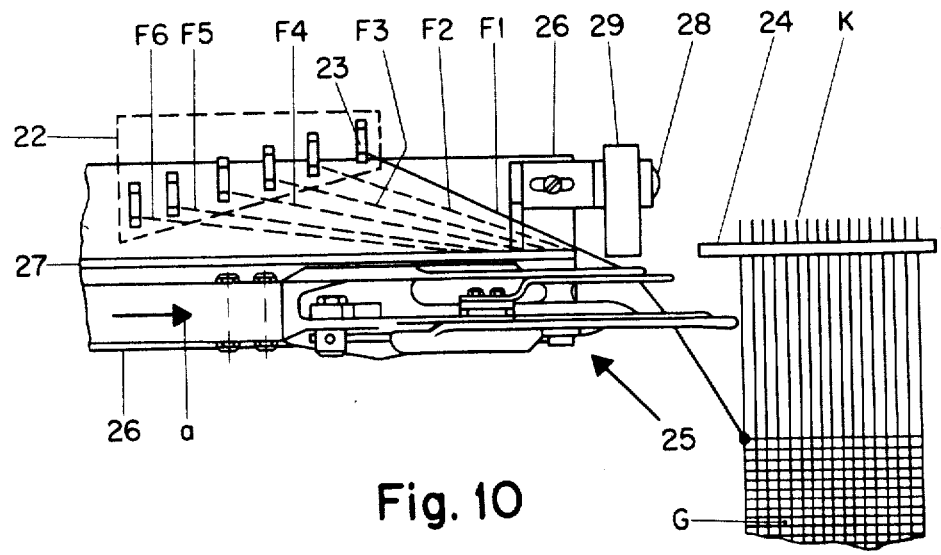
FIG. 10 illustrates a sensing unit similar to that of FIGS. 8 and 9 mounted as a weft monitor on a gripper weaving machine.

FIG. 10 illustrates the use of a sensing unit 29 similar to the one shown in FIGS. 8 and 9 as a yarn travel monitoring device in a weft stop motion on a gripper loom of which a section is reproduced schematically in top view. The loom comprises a color changing device 22 including guide eyelets 23, a gripper 25, a gripper guide rail 26 and a reed 24. Sensing unit 29 is adjustably mounted on guide rail 26 by means of a bracket 28. When appropriately adjusted the sensing unit 29 is positioned in the relatively small interspace between the right end of guide rail 26 and reed 24 through which the warp threads K are passed. The textile fabric is shown at G. FIG. 10 portrays the case where six weft threads F1 through F6 are provided and a single thread F1 is entering the shed. Thread F1 has been guided by its associated eyelet 23 of color changing device 22 into its lowered position before the gripper has commenced its motion from left to right, so that F1 is in contact with and lies on the edge of perpendicular guide flange 27 of rail 26. In this position, thread F1 can be caught by gripper 25 as shown in such Figure. The other five weft threads F2 through F6 are then in their lifted positions as are their associated eyelets, and cannot be gripped in this working cycle of the loom. However, the dashed lines representing the threads F2 through F6 show the latter when they are sized by the gripper for entering the shed.

In FIG. 10 the gripper 25 is advanced so far that thread F1 is in a position immediately before entering into sensing unit 29. When gripper 25 advances farther to the right the thread F1 is guided into the measuring area of sensing unit 29, and remains therein by the end of the weft insertion, or as long as the thread breaks prematurely, whereby a control signal is generated by sensing unit 29 for stopping the loom.

The invention sensing unit cannot only be successfully used for measuring dimensions and monitoring the movement of textile threads in the widest sense including pre-spun threads, monofilaments and multifilaments, rather also can be used for metallic wires and heddle wires and thread-like structures formed of other materials, such as glass fiber strands, all by way of example. It is in this sense that the term "thread" as used throughout this patent should be understood and such expression is employed with the broadest possible connotation.

While there is shown and described present preferred embodiments of the invention, it is to be distinctly understood that the invention is not limited thereto, but may be otherwise variously embodied and practiced within the scope of the following claims.

Accordingly, what is claimed is:

1. An optoelectrical apparatus for distinguishing a surface condition of predominantly diffuse light reflection from a surface condition of predominantly regular light reflection of an object, comprising, in combination:

light transmitting means including two directional light sources for generating first and second scanning light beams having different paths and intersecting at a predetermined object scanning location, means for pulsing the scanning light beams in a manner that the light pulses of each beam follow the light pulses of the other beam in alternate sequence; and light receiving means including light sensing means responsive to light from the pulsed scanning light beams and disposed at a distance from said predetermined object scanning location is such a manner that a regularly light reflecting surface of an object arranged in said predetermined object scanning location and in a definite angular position relative to said light beams reflects light from one of said scanning light beams onto said light sensing means, whereas light from the other of said scanning light beams is reflected from such a positioned light reflecting surface in a direction where it does not impinge on the light sensing means.

2. The optoelectrical apparatus as defined in claim 1, wherein the light sensing means comprises a single directional light sensor, the optical axes of the directional light sources and light sensor intersecting in said predetermined location outside the light sensor.

3. The optoelectrical apparatus as defined in claim 1, wherein the light transmitting means comprises a pulse generator having first and second output terminals to which the first and second directional light sources are operatively connected for generating first and second unidirectional pulsed light beams, respectively, the light receiving means comprises a single directional light sensor having an optical axis, and electronic circuitry operatively connected in series with the light sensor, the light sources and light sensor are arranged such that the unidirectional pulsed light beams and the optical axis of the light sensor have a common intersecting point, and a casing provided to receive the pulse generator, the directional light sources, the directional light sensor and the electronic circuity.

* * * * *